(12) United States Patent
Franet

(10) Patent No.: US 6,250,055 B1
(45) Date of Patent: Jun. 26, 2001

(54) SUSPENSION FOR A MOWING UNIT

(75) Inventor: Roger Franet, Sarreguemines (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/287,510

(22) Filed: Apr. 7, 1999

(30) Foreign Application Priority Data

Apr. 28, 1998 (DE) .............................. 198 18 960

(51) Int. Cl.$^7$ .................................................. A01D 67/00
(52) U.S. Cl. .............................. 56/15.9; 56/14.9; 56/208
(58) Field of Search ................................... 56/14.9, 15.9, 56/DIG. 14, 208, 228; 172/395, 396, 419, 427

(56) References Cited

U.S. PATENT DOCUMENTS

| | | | |
|---|---|---|---|
| 2,701,940 | * | 2/1955 | Carr ........................................ 56/14.9 |
| 2,816,410 | * | 12/1957 | Nobles ................................... 56/14.9 |
| 3,474,601 | | 10/1969 | Burrough et al. . |
| 3,589,115 | | 6/1971 | Taylor et al. . |
| 3,780,506 | | 12/1973 | Tashiro . |
| 4,177,625 | * | 12/1979 | Knight et al. .......................... 56/208 |
| 4,182,099 | | 1/1980 | Davis et al. . |
| 4,187,664 | | 2/1980 | Meek et al. . |
| 4,206,582 | * | 6/1980 | Molzahn et al. ........................ 56/208 |
| 4,286,423 | * | 9/1981 | Caldwell et al. ...................... 56/15.9 |
| 4,724,661 | * | 2/1988 | Blakeslee et al. ..................... 56/208 |
| 5,427,184 | * | 6/1995 | Peck ..................................... 172/395 |
| 5,566,535 | | 10/1996 | Pruitt . |
| 6,116,007 | * | 9/2000 | Eggena et al. ........................ 56/15.9 |

FOREIGN PATENT DOCUMENTS

| | | |
|---|---|---|
| OS 1923 454 | 11/1970 | (DE) . |
| 26 07 364 B2 | 9/1977 | (DE) . |
| 31 06929 C2 | 12/1985 | (DE) . |
| 000429381 * | 5/1991 | (EP) .............................. 56/DIG. 14 |
| 0 634 092 A1 | 1/1995 | (EP) . |

* cited by examiner

Primary Examiner—Thomas B. Will
Assistant Examiner—Nathan Mammen

(57) ABSTRACT

A mower-conditioner includes a header suspended from a mobile, main transverse frame by a pair of lower links, a single upper link and a pair of counterbalance springs. The upper link incorporates a threaded spindle to which a crank is coupled for changing the effective length of the upper link which extends between respective bearings carried by the main frame and the header and in this way pivots the header about the horizontal transverse axis defined by the bearings at the forward ends of the lower links so as to change the cutting angle of the cutter bar incorporated in the header. The upper link is mounted for sliding through the bearing carried by the header so as to permit the header to pivot upwardly about the axis in response to the cutter bar coming into contact with an obstacle during cutting operation. A coil compression spring is received on the upper link and biases it to its full effective length, the spring acting to cushion any impact of the cutter bar with an obstacle tending to tilt the header and acting to return the header to its original position once the obstacle is passed. Counterbalance springs are coupled between opposite ends of the main frame and opposite sides of the header, the springs being substantially vertically oriented with their lower ends coupled close to the bearings at the fronts of the lower links which bearings are in turn displaced only a short horizontal distance from the center of gravity of the header so as to minimize the moments about the bearings due to the weight of the header and the force of the counterbalance springs.

8 Claims, 1 Drawing Sheet

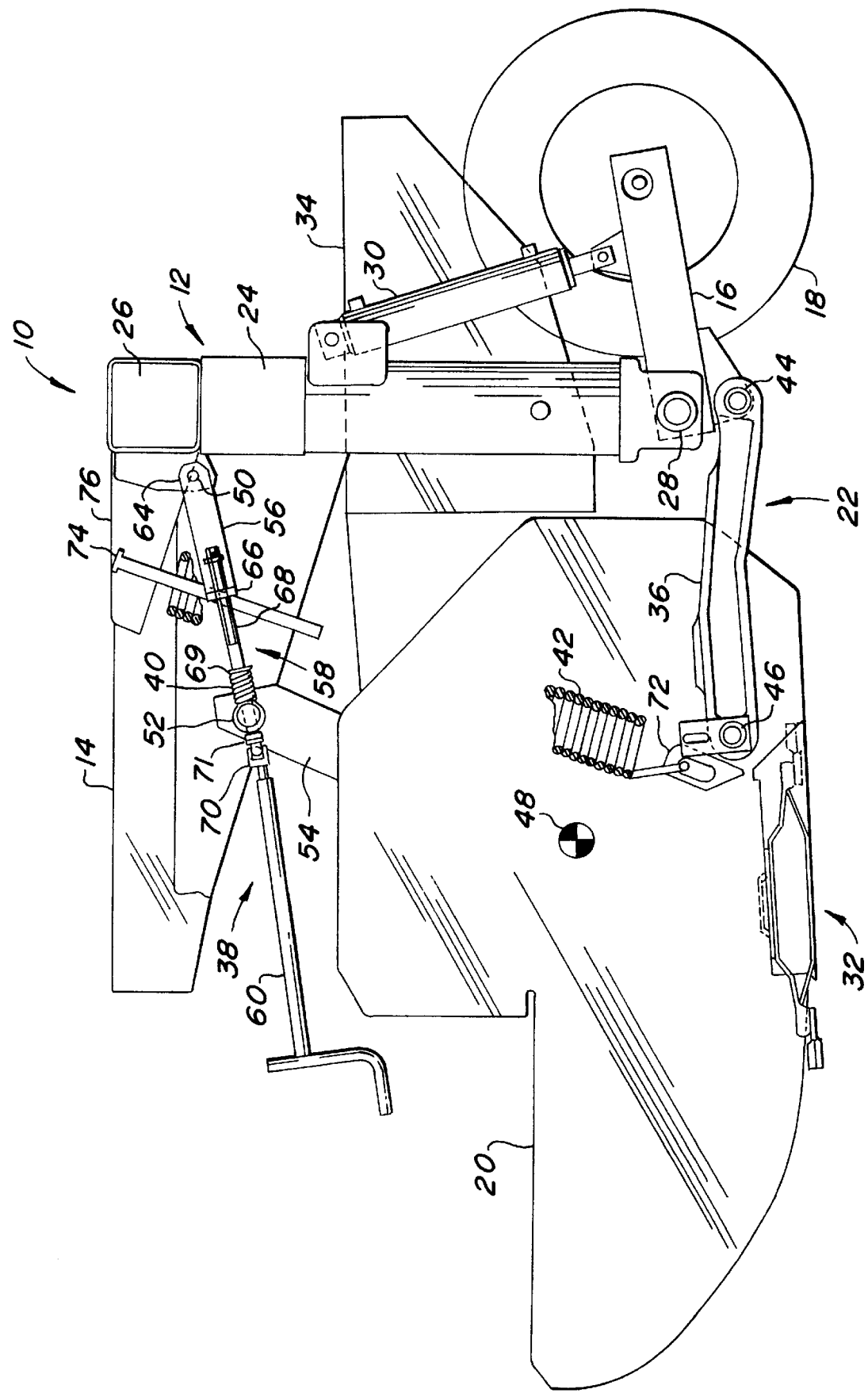

SUSPENSION FOR A MOWING UNIT

BACKGROUND OF THE INVENTION

The invention pertains to a suspension attaching a mower-conditioner header or platform on a mobile frame by means of at least one lower link and one upper link, each of which is vertically pivoting.

U.S. Pat. No. 3,780,506, granted to Tashiro on Dec. 25, 1973, discloses a mower-conditioner having a cutter bar incorporated in a header or platform which is suspended on a frame, in a vertically pivoting manner, by means of one lower link and two upper links. The upper links are each moved up and down by means of a hydraulic cylinder and are each biased upward by means of a spring. If, during operation, the cutter bar slides along the ground and hits an obstacle, it raises and tilts forward, since the hydraulic cylinders are then not pressurized so that the header is free to float.

A mower-conditioner disclosed in U.S. Pat. No. 4,182,099, granted to Davis et al. on Jan. 08, 1980, has a cutter bar incorporated in a header which is mounted to a mobile frame by means of pairs of nearly parallel upper and lower links. Upon hitting an obstacle, the cutter bar may yield upward only under certain conditions and, otherwise, fully receives the impact.

The underlying problem of the invention is found in the fact that the known suspensions are hardly suitable to protect the cutter bar from sharp impact when hitting an obstacle.

SUMMARY OF THE INVENTION

According to the present invention there is provided an improved suspension for crop harvester headers, and, more specifically there is provided suspensions for minimizing the forces imparted to the cutter bar of such headers when hitting an obstacle.

An object of the invention is to provide a suspension for a crop harvesting header which allows the header to pivot upward about a front pivot axis established by a lower suspension link when the cutter bar hits an obstacle on the ground during cutting operation.

A more specific object of the invention is to provide a suspension, as defined in the immediately preceding object, wherein an upper suspension link incorporates a spring which resists the upward pivotal movement of the header.

Yet another object of the invention is to provide an upper suspension link, as set forth in the immediately preceding object, which may be adjusted in length without disturbing the spring.

These and other objects of the invention will become apparent from a reading of the ensuing description together with the appended drawing.

BRIEF DESCRIPTION OF THE DRAWINGS

The sole FIGURE is a somewhat schematic, left side elevational view of a pull-type mower-conditioner having a header suspended from the mobile carrying frame in accordance with the principles of the present invention.

DESCRIPTION OF THE PREFERRED EMBODIMENT

Preliminarily, it is to be noted that while some structure is described below as occurring in pairs only one of the pair is depicted in the drawing with it to be understood that the other of the pair is identical or a mirror image of the one shown.

A machine 10, in the nature of a pull-type mower-conditioner or windrower, features a mobile frame 12, from which extends, in a forward direction, a draft tongue 14 and, in a rearward direction, a pair of wheel support arms 16, each arm rotatably supporting a wheel 18. A header or platform 20 is suspended from the frame 12 for vertical movement by means of a suspension 22, constructed in accordance with the present invention.

The machine 10 is representative of any one of a multitude of harvesters which, for operation, are towed by means of an agricultural tractor (not shown) across a field, the surface of which is uneven, and upon which obstacles may be found.

The frame 12 is constructed in the manner of a bridge which accommodates the rear region of the header 20 in the open space between a pair of laterally spaced posts 24 which respectively depend from opposite ends of a horizontal transverse beam 26. The tongue 14 has its rear end coupled to the beam 26, in a conventional manner not shown, for pivoting about an upright bearing support carried by the beam 26. The pair of wheel support arms 16 are respectively vertically pivotally mounted, as by respective bearings 28, to lower locations of the pair of posts 24. Coupled between each support arm 16 and the associated post 24 is an extensible and retractable hydraulic actuator 30, the opposite ends of each actuator 30 being pivotally mounted.

The header 20, as shown here, embodies a rotary cutter bar 32, including a gear housing supporting a plurality of cutter discs in side-by-side relationship to each other across the length of the gear housing. The cutter bar 32 serves to sever a standing crop from the ground and to feed the crop rearwardly into a conditioner, not shown. The crop which has been cut and conditioned is ejected rearwardly beneath a hood 34 which causes the crop to be formed into a windrow as it falls back onto the ground.

The suspension 22 includes a pair of lower, transversely spaced links 36, a single centrally located upper link 38, an upper link coil compression spring 40 and a pair of transversely spaced, coil extension counterbalance springs 42. The lower pair of links 36 have their rear ends respectively pivotally coupled, as at bearings 44, to forward locations of the pair of wheel support arms 16, and have their forward ends respectively pivotally coupled, as at bearings 46, to a pair of transversely spaced locations at opposite sides of the header 20. It is significant that the bearing locations 46 are located only slightly behind the center of gravity 48 of the header 20. An imaginary center line drawn through the bearings 44 and 46 at opposite ends of each of the pair of links 36, rises slightly from rear to front but remains essentially horizontal. It is here noted that while two links 36 are disclosed, this number of links is not absolutely necessary as one or more than two links will work in some installations without departing from the spirit of the invention.

The upper link 38 extends, starting from a bearing 50 on the frame 12 through a bearing 52 on the header 20, more precisely, on an upstanding arm 54 of the header. In detail, the upper link 38 is formed by means of a screw bracket 56, a spindle 58, the first spring 40, and in this embodiment, a crank 60, which are all arranged about a center axis which, from back to front, is angled downardly toward the ground. Consequently, the center lines through the bearings of the lower pair of links 36 and of through the bearings of the upper link 38, converge forwardly as viewed in the drawing.

In its simplest form, the screw bracket 56 is L-shaped with the longer leg 64 having its rear end mounted to the bearing 50, and having a front end defined by a short leg 66 containing a threaded hole, which is not evident, into which is screwed a threaded section 68 of the spindle 58. The spindle 58 is surrounded by the coil compression spring 40 and extends through and is slidably received in the bearing 52, which may be a pin containing a cross-drilled hole, for fore-and-aft movement. A spring seat 69 is located on the spindle 58 between the threaded section 68 and the bearing 52 with the spring 40 acting between the bearing and the stop, although a longer spring could be used with its rear end engaging the short leg 66 of the bracket 56. The crank 60 is connected to the forward end of the spindle 58 by a universal joint 70 located just forwardly of a limit stop 71 which limits rearward movement of the spindle 58 through the bearing 52.

The pair of counterbalance springs 42 are located at opposite sides of the mower-conditioner like the links 36, with each spring 42 having a hook at its lower end received in a hole provided in a bracket 72 provided on the header 20 and having its upper end secured, as by a retaining bolt 74, to a bracket or jib 76 projecting forwardly from the transverse beam 26. The points of application of the counterbalance springs 42 are located, in the embodiment represented, in a horizontal direction between the bearings 46 and the center of gravity 48. The center lines of the springs 42 are oriented in a vertical direction, inclined slightly from front to rear. The springs 42 are designed and preadjusted to exert a desired lifting force on the header 20 so that the latter will have only a small percentage of its weight bearing on the ground during cutting operation.

The following operation results in accordance with the above-described structure. Specifically, the header or platform 20 assumes a position which is a function of the dimensions of the lower and upper suspension links 36 and 38, respectively, their respective coupling points, as well as the tension exerted by the counterbalance springs 42. As disclosed here, the platform 20 carries out a substantially vertical parallel movement during operation.

The absolute distance between the ground and the header 20 is determined by the selected length of the hydraulic actuators 30.

The effective length of the upper link 38 and, in fact, the distance between the limit stop 71 and the bearing 50 determine the pitch of the mowing unit 32 with respect to the ground. The effective length of the link 38 may be adjusted by manipulating the crank 60 so as to either advance the spindle threaded section 68 rearwardly through, or to withdraw the section 68 forwardly from, the bracket leg 66, with shortening of the effective length resulting in the header 20, and hence cutter bar 32, tilting upwardly about the axis defined by the bearings 46, and with lengthening of the effective length resulting in the header 20 tilting downwardly about the axis defined by the bearings 46.

Upon hitting an obstacle which, as a rule, regularly strikes the leading part of the cutter bar 32, the header 20, with respect to the figure, pivots clockwise about the axis defined by the bearings 46, with the bearing 52 sliding rearwardly on the upper link 58 resulting in spring 40 being compressed. If necessary, the overall header 20 moves upwardly with the links 36 and 58, and once the obstacle is overcome, tilts and/or moves back to its original position.

Because there is only a short horizontal distance between the center of gravity and the axis defined by the bearings 46, and between the connection points of the lower ends of the counterbalance springs 42 and the axis defined by the bearings 46, the moment about this axis due to the spring load and the weight of the header 20 is minimized with the advantages that: (a) the weight of the platform 20 on the ground does not change very much when the cutting angle is adjusted; and (b) during impacts with obstacles the platform 20 rotates easily about the axis defined by the bearings 46 with the spring 40 acting to absorb the shock load.

Thus, the suspension 22 permits vertical adjustment of the header 20 relative to the ground, yielding motion when hitting an obstacle and an adjustment of pitch with respect to the ground. In addition, the height of the header may be moved with the suspension 22.

What is claimed is:

1. In a harvesting machine including a main transverse frame, a header separate from the frame including a transverse crop severing cutter bar, and a float suspension coupling the header to the main frame including at least one generally horizontal lower link having its opposite ends respectively pivotally connected to said frame and said header at lower rear and front bearings, and at least one upper link disposed substantially parallel to said lower link and having its opposite ends respectively pivotally connected to said frame and said header at upper front and rear bearings with the upper link having a desired effective length and including structure permitting the header to pivot about said lower front bearing and embodying a spring resisting upward pivoting of said header about said lower front bearing from a normal working position, the improvement comprising: said upper front bearing including a transverse, pivotally mounted pin containing a fore-and-aft extending bore; said upper link including a cylindrical rod mounted for sliding in said bore and having a stop fixed thereto for engaging a front location of said upper front bearing; said spring acting between said upper front bearing and said cylindrical rod; said upper link including a length adjustable structure located rearwardly of, and separately from, said spring for changing said desired effective length between said upper rear and front bearings thereby effecting tilting of said header about said lower front bearing, whereby the cutting angle of the cutter bar may be adjusted without causing said spring to release or store any energy.

2. The harvesting machine defined in claim 1 wherein said length adjustable structure includes a bracket having a rear end pivotally mounted to said upper rear bearing; said bracket including a fore-and-aft extending threaded hole; and said rod including a threaded rear end portion received in said threaded hole for being advanced rearwardly into, or withdrawn forwardly from, said threaded hole so as to change the effective length of said upper link.

3. The harvesting machine defined in claim 2 wherein said spring resisting upward pivoting of said header about said lower front bearing is a coil compression spring received on said rod and acting between said upper front bearing and a spring seat carried by said rod at a location forwardly of said bracket.

4. In a harvesting machine including a mobile transverse main frame, a header separate from said main frame and embodying a transverse cutter bar, a float suspension coupling the header to the main frame and including a pair of fore-and-aft extending lower links respectively located at opposite sides of said header with each lower link having its front and rear ends respectively coupled to a lower front bearing carried by said header and a lower rear bearing carried by said main frame, with said lower front bearings defining a horizontal transverse axis about which said header is pivotable, an upper link disposed in general parallel relationship to and spaced inwardly relative to said lower links and including a desired effective length extending between upper front and rear bearings respectively coupling said upper link to said header and to said main frame, a pair of counterbalance springs located at opposite sides of said header with each spring being coupled for transferring the majority of the weight of said header to said main frame, the improvement comprising: said upper front bearing including a horizontal transverse bearing pin containing a fore-and-aft extending cross bore; said upper link including a rod section received for sliding in said cross bore and including a stop member located forwardly of said cross bore for preventing said upper link from being withdrawn rearwardly through said cross bore; an upper link spring mounted between said upper link and said header for resisting upward pivotal movement of said header about said horizontal transverse axis; said header having a center of gravity located a short fore-and-aft distance from said lower front bearings associated with said pair of lower links; and said pair of counterbalance springs having respective lower ends coupled to said header at locations in the vicinity of said lower front bearings whereby the weight of the header and the force exerted by said counterbalance springs effect only small moments about said horizontal transverse axis.

5. The harvesting machine defined in claim 4 wherein said upper link includes length adjustable structure for changing said desired effective length of said upper link so as to cause said header to pivot about said transverse axis for adjusting a cutting angle of said cutter bar without affecting said upper link spring.

6. The harvesting machine defined in claim 5 wherein a spring seat is spaced rearwardly of said bearing pin; and said upper link spring being a coil compression spring received on said rod section with front and rear ends thereof respectively being in engagement with said upper front bearing and said spring seat.

7. The harvesting machine defined in claim 6 wherein said rod section of said length adjustable structure includes a threaded rear section received in a threaded hole of a bracket coupled to said upper rear bearing, whereby turning of said rod section will result in said desired effective length of said upper link being adjusted.

8. The harvesting machine defined in claim 7 wherein a handle is connected to a forward end of said rod section located forwardly of said upper front bearing.

* * * * *